United States Patent [19]
Schmidt et al.

[11] Patent Number: 5,951,798
[45] Date of Patent: *Sep. 14, 1999

[54] PROCESS FOR PRODUCING A MULTI-LAYER WEB AS AN UPHOLSTERY COVERING MATERIAL

[75] Inventors: Gunter Schmidt, Sindelfingen; Peter Boettcher, Chemnitz; Marcus Schmitz, Moenchengladbach, all of Germany

[73] Assignee: Mercedes-Benz AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,328

[22] Filed: Sep. 18, 1996

[30] Foreign Application Priority Data

Sep. 18, 1995 [DE] Germany ............................ 195 34 252

[51] Int. Cl.$^6$ .............................. B32B 5/14; B32B 31/08; B32B 31/20
[52] U.S. Cl. ................... 156/148; 156/306.6; 156/309.6; 156/311; 156/312; 156/324
[58] Field of Search ................................. 156/62.2, 62.8, 156/148, 324, 309.6, 306.6, 282, 312, 311; 264/113, 122, 123

[56] References Cited

U.S. PATENT DOCUMENTS

| | | |
|---|---|---|
| 2,543,101 | 2/1951 | Francis, Jr. . |
| 3,180,778 | 4/1965 | Rinderspacher et al. ................ 156/311 |
| 3,619,322 | 11/1971 | Fleissner . |
| 3,925,130 | 12/1975 | Brown . |
| 4,659,071 | 4/1987 | Woltron . |
| 4,794,038 | 12/1988 | Marcus . |
| 4,828,914 | 5/1989 | Caldwell . |
| 5,322,577 | 6/1994 | Greten et al. ........................... 156/62.2 |
| 5,492,580 | 2/1996 | Frank .................................. 156/148 X |
| 5,508,093 | 4/1996 | Medhorn . |

FOREIGN PATENT DOCUMENTS

| | | |
|---|---|---|
| 91 16 536 U | 1/1993 | Germany . |
| 41 29 188 A1 | 3/1993 | Germany . |
| 40-15466 | 7/1965 | Japan . |
| 62-53635 | 11/1987 | Japan . |
| 63-139147 | 9/1988 | Japan . |
| 2 141 376 | 12/1984 | United Kingdom . |

OTHER PUBLICATIONS

Mercedes–Benz Aktiengesellschaft, Designation of A type of Multi–layer Material, (translation), Feb. 18, 1993.

Office Action, Oct. 22, 1997, Japan.

G. Schmidt, "Laminating car Upholstery Materials by Means of Nonwoven Fiber Materials", *Melliand Textilberichte* Jun. 1992, pp. 479–486.

G. Schmidt, "Spaced Knitted Fabrics with and without a Design Side for Applications in the Automobile" *Melliand Textilberichte* Jan. 1993, pp. 37–39 and 129–134.

H. Kauderer "Verfahrenstechniken der Kontinuierlichen Textilaminierung" in: DE–Z Textilpraxis International Nov. 1993, pp. 895–899.

*Primary Examiner*—Sam Chuan Yao
*Attorney, Agent, or Firm*—Evenson, McKeown, Edwards & Lenahan, P.L.L.C.

[57] ABSTRACT

The present invention relates to a process for the continuous production of a multi-layer web comprising an exterior covering and a nonwoven material disposed underneath. According to the present invention, a nonwoven material which has been prebonded is used as the starting product, and the steps of additional bonding, calibrating, and smoothing of the nonwoven material and of laminating the nonwoven material and the exterior covering are combined in a single process. The present invention, in addition to achieving a cost advantage, also produces a covering material that provides better sitting conditions, equivalent to the foam backed covering materials with respect to physical textile values yet being easier to recycle and. In addition, recycled textile products can be worked into the covering material of the present invention as reprocessed fibers without losing any advantage.

15 Claims, No Drawings

PROCESS FOR PRODUCING A MULTI-LAYER WEB AS AN UPHOLSTERY COVERING MATERIAL

BACKGROUND AND SUMMARY OF THE INVENTION

This invention relates to a process for producing a multi-layer web consisting of an exterior covering laminated with an adhesive layer on a nonwoven material which has a higher standing (i.e. perpendicular to the surface of the material) fiber portion.

Covering materials for upholstered furniture and particularly for vehicle seats, as well as softly backed covering parts, such as interior door coverings, should have a certain inherent stiffness. An inherent stiffness makes the material easier to handle when the coverings are sewn as well as when they are used, which is why covering materials are generally laminated on flexible-foam layers with thin polyurethane (PUR) foam webs. Covering materials prepared in this way not only feel softer than covering materials resting directly on the underpadding of the seat but such covering materials also retain a wrinkle-free form even after extensive usage.

It should be remembered in this context that, particularly in vehicles, persons may remain in essentially the same sitting position for several hours without interruption. Covering materials reinforced in this fashion do not become hung up on the back side, but slide well. Generally, the back side of the stiffened covering materials must also be provided with an air-permeable light textile web material, which are laminated onto the back side of the foam backing.

It is therefore understandable that such covering materials are quite expensive, particularly since the actual upholstery material alone is not inexpensive. Therefore, for the purpose of saving money, the above-mentioned layers of foam material, which have a thickness of approximately 2 to 8 mm, are generally used as the soft material layer as it is less expensive than nonwoven materials, although nonwoven materials provide for more comfortable seating.

The prerequisite for using a particular nonwoven material as backing for the upholstered material, is that the material must have sufficient permanent elasticity. Under the extended effects of heat, pressure and humidity, it must not be possible to permanently flatten the material but, at least after a certain cooling and drying time, the material must spring back to its original shape.

Generally, different webs, which in this case includes not only woven materials or knitted fabrics, but also nonwoven materials, such as leather or plastic, are joined with adhesives. Thus, for example, a woven web and a nonwoven material can be joined by placing the woven web on one side and the nonwoven material on the other side of a flat-bed laminating machine between pairs of guide bands which extend in parallel, straight lines which are closed on both sides, with heatable and coolable parts. According to this technique, the covering materials backed by foamed material can also be laminated.

However, flame laminating process are preferably used, in which approximately 0.6 mm of the PUR foam-material foil is melted off and the liquid melted PUR foam-material is used as the adhesive. Generally, different types of adhesives and adhesive application methods for webs, as well as drying and hardening processes are used. For example, one method involves the application of a film of melted adhesive consisting of fine individual points on one surface and joining same with the web. Another method involves placing a thin nonwoven material consisting only of binding fibers on one web side or letting such a binding fiber nonwoven material run between the webs to be glued together.

Different types of nonwoven materials which are suitable in this context, their applicability as car upholstery materials and testing methods are described for example in G. Schmidt, "Laminating Car Upholstery Materials by Means of Nonwoven Fiber Materials", *Melliand Textilberichte* 6/1992, pages 479 to 486, and "Spaced Knitted Fabrics with and without a Design Side for Applications in the Automobile", *Melliand Textilberichte* 1/1993, Series 1 and 2, pages 37 to 39, and pages 129 to 134, the disclosures of which are herein incorporated by reference. German Patent Document DE 91 16 536 U1 also discloses a multi-layer, textile covering material of this type, the disclosure of which is herein incorporated by reference.

Accordingly, multi-layer covering materials useful as car upholstery, in which a top material is laminated together with a nonwoven material which is in the form of a non-woven knitted fabric is generally known in the art. Since the rear side of these covering materials has a type of knitted layer, a third rear-side protective lamination is not required here. The disadvantage of these covering materials, which with respect to seating comfort are superior to the foam-backed multi-layer alternative, is the manufacturing price, which is comparatively high despite being only two layers.

For this reason, this type of covering material has not been widely accepted as a substitute for the foam alternative despite its functional advantages. The higher cost results not only from the high-expenditure, multi-step manufacturing process of the nonwoven materials, specifically the manufacturing of plastics, fibers, and other nonwoven materials, as well as the bonding of the nonwoven materials by means of knotting, but also from the required calibrating operation. only a calibrated and smoothed, admixture-bonded non-woven material offers the required prerequisites for a visually qualitative condition which is equal to the foam-backed covering materials.

U.S. Pat. No. 3,619,322, the disclosure of which is herein incorporated by reference, discloses a process wherein a nonwoven fiber material formed from a fiber mixture including so-called binding fibers is bound between two guide bands extending parallel and in a straight line by means of pressure and heat in such a manner that individual fibers can no longer be easily separated out of the exposed surfaces of the formed nonwoven material and that these nonwoven surfaces have a smooth and flat design. Binding fibers are fibers made of a thermoplastic material with a lower melting point than the remaining fibers of the nonwoven material. At least one of the guide bands is constructed as a sieve so that the heat in the form of hot air can be blown into the nonwoven fiber material or can be blown through it. In addition, by means of this bonding process, known as thermofusion, the nonwoven material has a predetermined uniform thickness, less adhesive on its surface and slightly more resistance to bending and shearing so that it can be more easily handled when processed into textile products.

Recently, a different type of binding fiber has been disclosed, specifically a so-called bi-component binding fiber in which two thermoplastic materials of different melting points, for example, 140° C. and 220° C., are processed in a concentric arrangement with the lower melting plastic on the outside to form a single fiber.

Based on the above-described methods, it is an object of the present invention to disclose a low-cost process for producing multi-layer webs having a highly uniform thickness, in which, because of the lower cost of the process, higher quality textile materials are available for use as the backing material of multi-layer textile or non-textile coverings or interior fitting materials and/or reprocessed fibers can be used, therefore increasing the potential for savings.

According to the present invention, this and other objects are achieved by a process for the continuous manufacture of a multi-layer web consisting of an exterior covering with a nonwoven material disposed underneath, wherein the nonwoven material contains a portion of bi-component binding fibers and, of the fibers of the nonwoven material, at least 20%, preferably approximately 70%, of the fibers or of the fiber length portions are arranged approximately at a right angle with respect to the nonwoven surface, in the process, the nonwoven material, which has not been additionally bonded or calibrated, and the web of the exterior covering are jointly guided in a continuous manner between two guide bands extending in an approximately parallel plane and in a straight-line fashion, in which case increasing pressure is exercised on the two webs and heat is supplied by way of the closed and heated guide bands, as a result of which, in a uniform working step, the nonwoven material is additionally bonded by means of the bi-component binding fibers which melt on the outside and are embedded in the nonwoven material, and compressed by the pressure which is simultaneously applied in a laminar manner such that the thickness of the nonwoven material is reduced, the nonwoven material is calibrated and the exposed nonwoven surface is smoothed by means of the compression between the parallel guide bands under the effect of pressure and heat, and furthermore, the two webs are laminated upon one another by using an adhesive applied in-between.

According to the present invention, this and other objects are also achieved by another process for the continuous manufacture of a multi-layer web consisting of an exterior covering with a nonwoven material disposed underneath, wherein the nonwoven material contains a portion of bi-component binding fibers and, of the fibers of the nonwoven material, at least 20%, preferably approximately 70%, of the fibers or of the fiber length portions are arranged approximately at a right angle with respect to the nonwoven surface, in the process, an additionally bonded, smoothed and calibrated nonwoven material is formed directly from pile or a loose nonwoven material, wherein for the additional bonding, smoothing and calibrating of the nonwoven material, the nonwoven material is continuously guided between two guide bands extending at a distance in an approximately parallel plane and in a straight-line manner, pressure being increasingly exercised on the nonwoven material and heat being supplied by way of the closed and heated guide bands, as a result of which, in a directly successive process sequence, a voluminous, prebonded nonwoven material is formed, the nonwoven material is additionally bonded by means of the bi-component binding fibers which melt on the outside and are embedded in the nonwoven material, and is compressed by the pressure which is simultaneously applied in a laminar manner such that the thickness of the nonwoven material is reduced, the nonwoven material is calibrated and the exposed nonwoven surface is smoothed by means of the compression between the parallel guide bands under the effect of pressure and heat, subsequently, the additionally bonded and calibrated nonwoven material is laminated onto the web of the exterior covering while an adhesive is disposed in-between the layers.

This invention relates to a cost-neutral substitution of the previously used foam material layers, which do not provide optimal sitting conditions, by textile webs having the same function which have a high standing fiber portion, which in the past had been more expensive but provide better sitting conditions than foam material layers. Several types of textile webs listed below have a high standing fiber portion and are usually nonwoven knitted fabrics of different makes. As a result of the combination of different manufacturing steps into a single process step according to the present invention, a cost advantage is achieved in the manufacturing of the multi-layer composite which from a cost standpoint, makes it competitive with foam-backed covering materials.

Additionally, the covering material provides better sitting conditions and is approximately equivalent to the foam-backed covering materials with respect to other physical textile comparative values. In particular, the covering material produced according to the present invention can be recycled in a much simpler and better fashion and without any functional disadvantages, recycled textiles can be used as reprocessed fibers into this covering material in a low-cost manner.

The two processes of the present invention cited above, differ in the cost-reducing combinations of steps. The first cited process starts out with a once prebonded nonwoven material, as defined below, as a separately produced initial product, wherein the steps of additional bonding, calibrating and smoothing of the nonwoven material as well as the lamination of the nonwoven material and the covering material are combined.

In contrast, according to the second process cited above, at least the steps of manufacturing a voluminous nonwoven material as well as the additional bonding, calibrating and smoothing of the nonwoven material are combined in the process. This can take place, for example, by directly joining the machines which form the nonwoven material with the process of thermofusing, calibrating and smoothing. This initial product of high quality manufacturing must then only be laminated together with the covering material. Here, it is also possible that this lamination step is combined in a sequence which is uniform with respect to the machine construction and the process, which has further cost-reducing effects.

In the sense of the present invention, the term "covering" is the textile or non-textile top side of upholstered or covering composites, particularly as used in the interior fitting of vehicles of all types and in living areas. This covering is either a textile material, such as a woven fabric, a knitted loop-type fabric or the like or a non-textile, flat material, such as leather, imitation leather, foil, a coated textile, or similar material. For the purpose of the present invention, this covering can be used as a web, a roll or as a surface-limited part, for example, as a prepared animal skin or as a cut textile blank for a seat.

The term "nonwoven material", refers to a flat fiber or filament arrangement in which the fibers or filaments are bonded, as opposed to being loose, by mechanical processes (for example, by nonwoven knitting or needles), by chemical processes (for example, by fiber-wetting adhesives) and/or by thermal processes (for example, by the start-melting of bi-component fibers) to form a cohesive flat-shaped structure. This bonding of the nonwoven fibers or filaments is required in order to facilitate handling. In the context of the present invention, this bonding should be understood only as a prebonding or initial bonding. In effect, according to the present invention, the nonwoven material is additionally bonded beyond this initial bonding as a result of the embedding and activating of bi-component binding fibers into the nonwoven material. This results in higher physical textile pressure and elasticity values similar to those of a foam material. In the case of a normal nonwoven material, such additional bonding would be unacceptable because of cost limitations. However, in the present invention, this additional bonding step is harmonically and cost-effectively combined with the laminating step which is necessary anyway.

Other objects, advantages and novel features of the present invention will become apparent from the following detailed description of the invention.

DETAILED DESCRIPTION OF THE INVENTION

In preferred embodiments of the present invention, the following textile webs, which have a high standing fiber portion can be used. The names used to describe the following materials are generally used in German technical journals to refer to same, and may under certain circumstances be trademarks of the respective manufacturers:

A) Dilourized needle punched nonwoven material: In this case, the top or standing side, which is generally made to be facing the covering material, consists of pile fibers which, in a velour-type manner, project vertically from the needle punched nonwoven material. The bottom side of this material is formed by a flat random fiber layer of a medium fiber bonding. The thickness of the pile fiber layer measures approximately 2 to 6 mm, and the portion of vertically arranged pile fibers with respect to overall fibers of the dilourized needle punched nonwoven material is 15 to 40%.

Based on a voluminous, transversely oriented nonwoven fiber, this nonwoven fiber is first mechanically bonded by punching it through the bottom material with a barbed needle. Then, fiber portions are punched out of the bottom material toward one side by punching through with special needles resulting in a structure on the corresponding side of vertical pile fibers.

B) Dilourized nonwoven sewn knit-type material, also known as mali nonwoven: A voluminous nonwoven material with a top or standing side consisting of vertically projecting pile fibers and a bottom side consisting for the most part of fiber loops, wherein the thickness of the pile fiber layer may be 1 to 5 mm and the pile fiber portion may be approximately 10 to 50%.

In this case, the basis is also a transversely oriented nonwoven fiber, wherein portions of the nonwoven fibers are first shaped into fiber loops. Then other portions of the nonwoven fibers are pushed out through the material by punching with special needles and a vertical fiber pile is formed on the corresponding side of the nonwoven material.

C) Kunit nonwoven knit-type material: A voluminous nonwoven material whose top or standing side consists of vertical pile fiber folds and whose bottom side consists entirely of fiber loops. Generally, the thickness is between 2 and 14 mm. The portion of vertically arranged fibers with respect to the total number of fibers is about 30 to 80%.

The manufacturing of Kunit nonwoven knit-type structures is based on thin, longitudinally oriented fibrous pile which are first pleated in a winding manner and wherein the thus formed pile folds are then horizontally compressed. This structure is stabilized in that fiber loops, which are integrated into the nonwoven material in a surface covering manner, are formed from the dense family of pile front folds of one side and are intertwined.

D) Multiknit nonwoven material: A voluminous nonwoven material whose top or standing side and bottom side consist completely of fiber loops. The fiber layer formed between the fiber loop surfaces contains predominantly vertically orientated fibers. Suitable thicknesses are between 4 and 10 mm. The portion of fibers which are vertical relative to the total number of fibers is about 30 to 60%.

The basis of the manufacturing of this nonwoven knit structure is as described above for Kunit nonwoven knit structures wherein fiber loops are formed from the fiber pile folds in a surface covering manner on both sides.

E) KSB nonwoven knit structure: A voluminous nonwoven material whose top or standing and bottom side consist completely of fiber loops wherein between both fiber loop surfaces, two fiber layers are provided which have a predominantly vertical fiber orientation and one fiber loop layer is provided which is situated in the center, arranged in a horizontal manner to act in a connecting manner. The producible thicknesses is 6 to 24 mm and the vertical fiber portion is approximately 20 to 50% based on the total number of fibers.

The starting material for this nonwoven knit structure is two layers of Kunit nonwoven knit structures which are placed upon one another in a mirror-image manner with the two loop-free sides facing one another. The two layers are connected with one another by pulling fiber portions out of the mutually facing fiber pile fold rows of both layers and making them into fiber loops.

F) Struto thermofusion nonwoven material: A voluminous nonwoven material which has a close sequence of parallel pile front folds arranged in lines on both exterior sides and in the center layer, consists of a plurality of sections of thin pile with a random fiber position which are vertically placed close to one another. The producible thicknesses is 10 to 40 mm and the vertical fiber portion is about 30 to 80%.

The manufacturing of the Struto thermofusion nonwoven material is based on a longitudinally orientated pile fiber with a binding fiber portion. The thin fiber pile is pleated in a winding manner and the vertically placed standing pile folds are horizontally compressed. This structure is then stabilized in a furnace by means of the binding fibers, that is, by thermofusing.

According to a preferred embodiment of the present invention, a portion of 5 to 30% by weight, preferably of approximately 15% by weight, of bi-component binding fibers are mixed into the nonwoven material.

Furthermore, the bi-component binding fibers preferably have a fiber titer (thickness) of approximately 10 dtex and a fiber length of an average of 60 mm.

In another preferred embodiment, a portion of from 50 to 60% by weight, preferably of approximately 55% by weight, of PES (polyester) fibers with a fiber titer (thickness) of approximately 7 dtex and a fiber length of an average of 75 mm and a portion of from 25 to 35% by weight, preferably of approximately 30% by weight, of PES (polyester) fibers with a fiber titer (thickness) of approximately 11 dtex and a fiber length of an average of 60 mm are mixed into the nonwoven material.

In another preferred embodiment, a fiber portion of fine fibers with a titer (thickness) of approximately 1.7 dtex and a portion of bi-component binding fibers with a fiber titer (thickness) of approximately 2.2 dtex are mixed into the nonwoven material.

In another preferred embodiment, a portion of from 30 to 90% by weight, preferably of approximately 60% by weight, of reprocessed fibers, particularly reprocessed wool, is mixed into the nonwoven material.

In another preferred embodiment, during the additional bonding, compressing, smoothing, calibrating and laminating, the exterior covering and the nonwoven material are compressed at a temperature of from 180 to 205° C., preferably at approximately 195° C.

In another preferred embodiment of the first process, during the additional bonding, compressing, smoothing, calibrating and laminating, the exterior covering and the nonwoven material are heated from the nonwoven side to a temperature of from 180 to 205° C., preferably of approximately 195° C., and are heated from the exterior covering side to a temperature of from 90 to 150° C., preferably of approximately 140° C., and are compressed in this condition.

In another preferred embodiment, the uncalibrated nonwoven material which is prebonded only once and the exterior covering or the calibrated and additionally prebonded nonwoven material, which are placed between pairs of guide bands, which extend at a distance in a parallel and straight-line manner, are closed on both sides, and are partially heatable and partially coolable, are laminated with adhesive in a flat-bed laminating machine.

In another preferred embodiment, a hot-melt type adhesive in the form of a surface-covering 7×7 matrix of fine adhesive points is applied to the surface to be laminated.

In another preferred embodiment, the adhesive is placed in the form of a thin nonwoven consisting only of binding fibers on the one side and this binding fiber nonwoven material is applied between the surfaces to be glued together.

In another preferred embodiment of the first process, the additional bonding, compressing, smoothing, calibrating and laminating of the nonwoven material and of the covering material takes place in partially fabricated blanks.

In another preferred embodiment of the second process, the laminating-together of the calibrated and additionally bonded nonwoven material with the covering material is combined in a sequence which is uniform with respect to the machine used and the process with the manufacturing of the nonwoven material as well as the calibrating, smoothing and additional bonding of the nonwoven material.

In a comparison of the present invention with a conventional covering material with similar functions and a laminated PUR foam material layer and a rear-side knitted structure, a textile multi-layer composite produced according to the present invention was prepared wherein the supporting layer was formed of a Kunit nonwoven knit materials. More specifically, two different Kunit nonwoven knit materials were selected, whose data are contained in the following table as well as the comparative data of the conventional covering material made of PUR foam material layer.

The data illustrates that, as intended, the compared covering materials had very similar results with respect to their physical textile test values, because of the suitable selection of covering materials with purely textile structures. For this purpose, it was necessary to select Kunit nonwoven materials with a slightly higher mass, that is, a slightly higher weight per unit of volume. For the comparison, a PUR foam material layer with a volumetric weight of 40 kg/m$_3$ and a strain hardness of 4.3 kPa was used as well as a rear side knit structure of 55 g/mm$^2$. In the two Kunit samples, 55% polyester (PES) fibers 7 dtex/76 mm, 30% PES (polyester) fibers 11 dtex/60 mm and 15% PES bi-component binding fibers 9.9 dtex/60 mm were used. The unit dtex refers to the yarn count and is equal to 1 g/10000 m. The uniform laminating and calibrating process according to the present invention was carried out at 195° C. The achieved test results are as follows:

| | Specimen 1 with PUR Foam and Knit | Specimen 2 with Kunit a | Specimen 3 with Kunit b |
|---|---|---|---|
| Volumetric weight [kg/m$^3$] | 60 | 70 | 80 |
| Strain Hardness [kPa] | 4.6 | 3.6 | 6.0 |
| Pressure Elasticity Ratio [%] | | | |
| $a_{30\text{-}5H}$ | 28 | 39 | 42 |
| $a_{30\text{-}5E3}$ | 96 | 93 | 92 |
| Recuperative Capacity [%] | | | |
| Longitudinally | 96 | 84 | 82 |
| Transversely | 93 | 90 | 88 |
| Remaining Deformation [%] | | | |
| Dry | 8 | 18.5 | 16.5 |
| Wet | 19 | 20.5 | 16.5 |
| Burning Test | | | |
| Longitudinally | A | A | A |
| Transversely | A | A | A |

In the case of the Kunit nonwoven knit structure which is additionally bonded by thermofusing, the strain hardness can be controlled by the volumetric weight, that is, by the thickness. The Kunit knit structure can be compressed approximately 12% less and its recuperative capacity is slightly lower. In the case of the remaining deformation, the values for the dry specimen at 70° C. are slightly more favorable than for the PUR foam, whereas, in the wet/hot condition corresponding to a warm humid sitting condition, there is no difference. With respect to the burning test (SMVSS 302), the best values overall were achieved with the Kunit PES (polyester) nonwoven material, without the addition of any flame proofing agents which are customarily added to covering materials made with PUR foam.

In summary, it may therefore be said that the structure with a base of Kunit nonwoven knit material which is additionally bonded by thermofusion, is comparable with the covering materials with PUR foam and a knitted rear side with respect to the physical textile values. If, in addition, the advantages of an improved sitting condition because of the exclusive use of fibers, a better resistance to hydrolysis of the PES (polyester) fibers in comparison to that of PUR foam and a better recycling capacity because of a more homogeneous material structure of the multi-layer composite, are taken into account, a clear advantage is seen in favor of the textile multi-layer composite which can be produced according to the present invention, while the overall costs of the compared processes are the same.

Laminations are customary in which the nonwoven material is placed in the multi-layer composite in such a manner that the loop side or needle side of the nonwoven material forms the rear side of the multi-layer composite. This orientation of the nonwoven material has the advantage that the top material has a soft support, while the rear side does not shed as easily and has a knit-type appearance.

A disadvantage in some cases is a certain sandwich-type stiffness of the multi-layer composite, which may result in undesirable wrinkling in narrow curvatures of the covering material. It may therefore be desirable depending on the individual case to laminate the nonwoven material with its loop side or needle side together with the top material so that the more open pile side forms the rear side of the multi-layer composite. This type of lamination has the advantage that the composite is less resistant to bending and forms fewer wrinkles in narrowly curved areas. As a result, the top material is also more effectively stiffened because the more stable side of the nonwoven material is laminated directly together with the top material. However, the disadvantage in this case is that the top material feels slightly stiffer and the rear side of the multi-layer composite may shed more easily.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for the continuous manufacture of a multi-layer web, the multilayer web including an exterior covering and an underlaying nonwoven material, wherein the nonwoven material has a standing side formed of pre-bonded fiber loops forming an outside surface of the nonwoven material, wherein at least 20% of the total number of the fibers are arranged approximately at a right angle with respect to a bottom side of the nonwoven material, and wherein a portion of 5 to 30% by weight of the fibers of the nonwoven material are bi-component binding fibers being mixed between the fibers of the nonwoven material, the process comprising the steps of;

(a) applying an adhesive between the exterior covering and the nonwoven material to laminate the exterior covering to the nonwoven material, (b) jointly guiding the nonwoven material together with the exterior covering, the latter being positioned on the pre-bonded side of the nonwoven material, in a continuous manner between a pair of closed guide bands extending at a distance in an approximately parallel and straight-line manner, (c) exercising increasing pressure on the exterior covering and the nonwoven material, (d) supplying heat from the guide bands, thereby heating the nonwoven material side to a temperature of from 180 to 205° C., and heating the exterior covering side to a temperature of from 90 to 150° C., and (e) cooling the nonwoven material and the exterior between both the guide bands, to thereby simultaneously (i) bond the outside surface of the nonwoven material by melting the bi-component binding fibers in the nonwoven material, (ii) reduce and adjust the thickness of the nonwoven material, (iii) smooth the outside surface or the nonwoven material, and (iv) laminate the exterior covering to the pre-bonded side of the nonwoven material.

2. The process according to claim 1, wherein approximately 70% of the total number of the fibers are arranged approximately at a right angle with respect to the bottom surface of the nonwoven material.

3. The process according to claim 1, wherein the nonwoven material is selected from the group consisting of dilourized needle punched nonwoven material, dilourized nonwoven sewn knit-type material, stich bonded meander knit-type material, loop nonwoven material bonded on both sides by fiber stiches, two loop nonwoven knit material bonded on one side by fiber stiches connected with one another, and slightly prebonded loop thermofusion nonwoven material which has a fraction of fibers which melt at a low temperature.

4. The process according to claim 1, wherein the portion by weight of bi-component binding fibers mixed into the nonwoven material is approximately 15%.

5. The process according to claim 1, wherein the bi-component binding fibers have a fiber titer of approximately 10 dtex and a fiber length of an average of 60 mm.

6. The process according to claim 1, wherein a portion of from 50 to 60% by weight of polyester fibers with a fiber titer of approximately 7 dtex and a fiber length of an average of 75 mm and a portion of from 25 to 35% by weight of polyester fibers with a fiber titer of approximately 11 dtex and a fiber length of an average of 60 mm are mixed into the nonwoven material.

7. The process according to claim 6, wherein a portion of approximately 55% by weight of polyester fibers with a fiber titer of approximately 7 dtex and a fiber length of an average of 75 mm is mixed into the nonwoven material.

8. The process according to claim 6, wherein a portion of approximately 30% by weight of polyester fibers with a fiber titer of approximately 11 dtex and a fiber length of an average of 60 mm is mixed into the nonwoven material.

9. The process according to claim 1, wherein a portion of fine fibers with a titer of approximately 1.7 dtex and a portion of bi-component binding fibers with a fiber titer of approximately 2.2 dtex are mixed into the nonwoven material.

10. The process according to claim 1, wherein a portion of from 30 to 90% by weight of reprocessed fibers is mixed into the nonwoven material.

11. The process according to claim 10, wherein a portion of approximately 60% by weight of reprocessed fibers is mixed into the nonwoven material.

12. The process according to claim 10, wherein the reprocessed fibers are reprocessed wool.

13. The process according to claim 1, comprising the step of heating from the nonwoven material side to a temperature of from approximately 195° C.

14. The process according to claim 1, comprising the step of heating from the exterior covering side to a temperature of approximately 140° C.

15. The process according to claim 1, wherein the adhesive is in the form of a thin nonwoven material consisting entirely of binding fibers.

* * * * *